United States Patent [19]

Rousset et al.

[11] Patent Number: 4,808,327
[45] Date of Patent: Feb. 28, 1989

[54] COMPOSITIONS OF PARTICULATE MAGNETIC OXIDES WITH A DEFECT SPINEL STRUCTURE, PREPARATION THEREOF AND APPLICATION THEREOF

[75] Inventors: Abel Rousset, Ramonville St Agne; Christiane B. Salvaing, Toulouse; Paul Mollard, Domene; Michel Gougeon, Toulouse; Philippe Tailhades, Mazamet, all of France

[73] Assignees: Centre National de la Recherche Scientifique (CNRS), Paris; Universite Paul Sabatier (Toulouse III), Toulouse, both of France

[21] Appl. No.: 62,609

[22] PCT Filed: Sep. 30, 1986

[86] PCT No.: PCT/FR86/00337
§ 371 Date: Jun. 1, 1987
§ 102(e) Date: Jun. 1, 1987

[87] PCT Pub. No.: WO87/02173
PCT Pub. Date: Apr. 9, 1987

[30] Foreign Application Priority Data

Sep. 30, 1985 [FR] France ................. 85 14439

[51] Int. Cl.$^4$ ............................. C04B 35/26
[52] U.S. Cl. ..................... 252/62.56; 252/62.57; 252/62.58; 252/62.59; 252/62.60; 252/62.61; 252/62.62; 252/62.63; 252/62.64
[58] Field of Search ............... 252/62.56, 62.57, 62.58, 252/62.59, 62.60, 62.61, 62.62, 62.63, 62.64

[56] References Cited

U.S. PATENT DOCUMENTS

| | | | |
|---|---|---|---|
| 3,223,641 | 12/1965 | Lessoff et al. | 252/62.56 |
| 3,873,461 | 3/1975 | Mollard et al. | 252/62.56 |
| 4,056,410 | 11/1977 | Lorradi et al. | 252/62.56 |
| 4,096,080 | 6/1978 | Mollard et al. | 252/62.56 |
| 4,321,302 | 3/1982 | Umeki et al. | 252/62.56 |
| 4,543,198 | 9/1985 | Kamiyama | 252/62.56 |
| 4,636,433 | 1/1987 | Kubo et al. | 252/62.56 |
| 4,664,831 | 5/1987 | Hibst et al. | 252/62.56 |
| 4,698,182 | 10/1987 | Nagai et al. | 252/62.63 |

FOREIGN PATENT DOCUMENTS

| | | |
|---|---|---|
| 3443049 | 6/1985 | Fed. Rep. of Germany . |
| 1311452 | 10/1962 | France . |
| 2245345 | 4/1975 | France . |
| 644639 | 10/1950 | United Kingdom . |
| 701224 | 12/1953 | United Kingdom . |

OTHER PUBLICATIONS

N. N. Greenwood, London "Rutterworths PLC" 1968, pp. 102–105.

Primary Examiner—William R. Dixon, Jr.
Assistant Examiner—David M. Brunsman
Attorney, Agent, or Firm—Cushman, Darby & Cushman

[57] ABSTRACT

Particulate magnetic oxide compositions based on iron oxide (III) and oxide of at least one bivalent metal selected among cobalt, iron, copper, zinc, magnesium, nickel, manganese and cadmium, characterized in that said compositions contain additionally in the form of an oxide from 0.2 to 5% by weight calculated on the total weight at least one additive or substituent selected among alkali metals, alkaline-earth metals, boron, the elements of columns 3, 4 and 5 of the periodical classification of elements having a molecular mass higher than 26, the transition metals 3d and 4d other than those already mentioned, and the rare earths, with the proviso that when an alkali metal or tin is present, at least another additive or substituent is also present, and in that said compositions have a structure of the lanucar spinel type; the preparation and application thereof are also disclosed.

16 Claims, No Drawings

COMPOSITIONS OF PARTICULATE MAGNETIC OXIDES WITH A DEFECT SPINEL STRUCTURE, PREPARATION THEREOF AND APPLICATION THEREOF

The object of this invention is new compositions of particulate magnetic oxides with a defect spinel structure, preparation thereof and application thereof.

It is known that in the industry relating to materials for high-density magnetic recording, powdered oxides of ferromagnetic materials are used in the form of submicron acicular particles with a high coercive field and high saturation and remanent magnetization values.

These magnetic powders can be prepared starting with organic salts, in particular, starting with mixed oxalates.

In French Patent Application No. 72.14215 (Publication No. 2,180,575), a process is proposed for preparing magnetic oxides of the ferrite type, i.e., compounds based on iron sesquioxide in which some of the ferric ions and some of the defects are replaced by one or more bivalent cations.

The bivalent cations which are compatible with a cubic spinel structure are those of cobalt, iron, zinc, copper, magnesium, nickel, manganese and cadmium.

The process according to the above-mentioned French patent consists, starting from a mixed oxalate, of decomposing this oxalate by heating it in air to a moderate temperature to produce a superparamagnetic oxide (because of the very small dimensions of the crystals, on the order of a few tens of Angstroms), reducing this oxide with hydrogen in the presence of water vapor to steer the crystallization of the oxide, which is still poorly organized, towards a cubic spinel lattice and produce a magnetite substituted with one or more bivalent metals, and finally oxidizing the magnetite thus obtained to convert all of the iron to the trivalent state. This results in solid solutions of gamma-$Fe_2O_3$ and ferrites of the type $MOFe_2O_3$, where M represents one or more bivalent metals selected from those previously mentioned.

The process for converting oxalates into oxides which has just been described makes it possible to produce particles of magnetic oxides most of which have retained the shape and dimensions of the initial oxalate particles. However, this process is not entirely satisfactory, for reasons which will be indicated.

It is worth mentioning here that when oxide particles are prepared, well-formed domains of matter (crystallites) form within the particles, separated by transition zones (crystallite boundaries) and micropores.

In this application, the term texture will be used to designate these arrangements of matter within a particle, the term internal sintering will be used to indicate improvement in this texture under the influence of heat treatments, and external sintering will be understood in its usual sense of leading to welding among particles with the appearance of dendrites. Internal sintering makes it possible to improve magnetic performance, while external sintering, in contrast, leads to a significant degradation therein.

Thus, the process which has just been described is not satisfactory in terms of the texture of the resulting oxide particles. The particles have a granular structure and exhibit crystallite boundaries with the presence of dendrites.

The presence of crystallite boundaries has an unfavorable influence not only on the magnetic properties but also on the mechanical strength characteristics of the particles. Specifically, crystallite boundaries constitute breakage point nuclei for the grains which, during subsequent handling of the powders, have a tendency to shatter into granules which are often essentially spherical in shape and are not compatible with good magnetic properties.

The powders obtained after such handling are therefore relatively heterogeneous.

In summary, these texture defects do not make it possible to obtain oxide powders meeting current needs in the area of magnetic recording.

The object of this invention is compositions of particulate magnetic oxides containing new adjuvant or substituent elements.

The adjuvants promote internal sintering and make it possible to significantly improve the texture of the particles and prevent external sintering. The particles produced have a homogeneous and nongranular texture with an absence of dendrites. This homogeneity of texture results in a considerable decrease in background noise.

The introduction of new substituent elements, making it possible to modify the magnetic properties and improve chemical stability, provide a great deal of latitude for adapting and modulating the properties of materials depending on requirements.

In addition, thanks to improvements made to the process for preparing the starting oxalates (improvements which do not form part of the invention claimed here) and thanks also to improvements made to the process for converting the oxalates into oxides, it has been possible to produce, in a controlled and reproducible manner, new compositions of oxides having suitable particle dimensions and satisfactory thermal and chemical stability.

It is worth noting that the various improvements forming the object of this invention have made it possible to introduce, into the crystal lattice of the oxides, ions such as ions of alkaline earth metals, rare earths or potassium, while it is generally considered that ions whose radius is equal to or greater than one Angstrom cannot enter into a crystal lattice of the spinel type such as that of gamma-$Fe_2O_3$; see, for example, Pascal: *Traité de chimie minerale* volume XVII, pages 629–630.

Integration of these ions into the crystal lattice can be demonstrated by the increase in the transformation temperature of the crystal system detected by differential thermal analysis. Specifically, it is known that the transformation temperature of gamma-$Fe_2O_3$ is approximately 460° C. With the substitution of cobalt and zinc in a total amount of 5% by weight, this transformation temperature rises to approximately 560° C. As the experimental section below shows, the addition of barium, for example, makes possible a very sharp increase in the transformation temperature, and this result in fact shows that the barium ion becomes integrated into the crystal lattice, whose stability it increases.

Furthermore, it must be noted that it is also not necessary for the added element to be in the crystal lattice of the iron-based oxide, since the specific surface area and the texture can be modified by an element which is located outside the crystal lattice. This is particularly the case with potassium, which, above 2% by weight, no longer enters into the crystal lattice but does significantly influence the crystal size and the specific surface area.

The object of this invention is therefore new compositions of particulate magnetic oxides containing iron-(III) oxide and the oxide of at least one bivalent metal selected from cobalt, iron, copper, zinc, magnesium, nickel, manganese and cadmium, characterized by the fact that the said compositions additionally contain, in the form of oxide, at a proportion of between 0.2 and 5% by weight referred to the total weight, at least one adjuvant or substituent selected from among the alkali metals (especially lithium, sodium, potassium), the alkaline earth metals (calcium, barium, strontium), boron, the elements in columns 3, 4 and 5 of the periodic table of the elements having a molecular weight greater than 26, the 3d and 4d transition metals other than those already mentioned and the rare earths, with the understanding that when an alkali metal or tin is present, at least one other adjuvant or substituent is also present, and by the fact that the said compositions have a defect spinel structure.

The percentage by weight indicated concerns the adjuvant or substituent element and not the corresponding oxide.

The elements in columns 3 through 5 of the periodic table with a molecular weight greater than 26 are, in particular: aluminum, silicon, phosphorus, gallium, germanium, arsenic, indium, antimony, bismuth and lead.

The 3d transition metals whose presence can constitute a characteristic of compositions according to the invention are: scandium, titanium, vanadium and chromium.

The 4d transition metals whose presence can constitute a characteristic of compositions according to the invention are: yttrium, zirconium, niobium and molybdenum.

Among the rare earths which can be present in compositions according to the invention, those mentioned in particular are neodymium, praseodymium, samarium, europium, gadolinium, terbium, dysprosium, holmium, erbium, ytterbium, lutetium, cerium, thulium, etc.

Generally, the bivalent metal which is present in the composition according to the invention represents between 1 and 10%, preferably between 1 and 5% by weight of the said composition.

The low levels of substituents or adjuvants present in the compositions according to the invention make it difficult to characterize these compositions by studing changes in the parameters of the crystal lattice by X-ray diffraction. The best criterion for characterizing the introduction of substituents into the crystal lattice is the change in the gamma→alpha transformation temperature, which varies greatly with the nature and concentration of the substituent.

The particulate compositions according to the invention are, especially, compositions formed of acicular particles with dimensions of several microns or more, and in particular compositions in which the particles have lengths between 0.05 and 0.5 μm, with an acicular ratio between 2 and 5, use of which is recommended for magnetic recording.

Among the particulate compositions according to the invention, particular mention is made of those in which at least 80% of the particles have a length equal to the average length ±0.1 μm, and an acicular ratio between ca. 2 and 5, with the average length being between 0.15 and 0.35 μm.

Such compositions can be obtained by selecting the starting compositions of oxalates in which the particles have suitable size and shape characteristics, taking into account the fact that when the oxalates are converted into oxides with the process according to the invention, the length of the particles is divided by a number which can vary between approximately 1.5 and 2, and the acicular ratio is divided by a number which can vary between approximately 1.5 and 2.5.

The process for preparing the starting oxalates and the final particulate magnetic oxides even makes it possible to prepare compositions in which at least 85% of the particles, and even in certain cases more than 90% of the particles, have these dimensional characteristics.

One particular object of the invention is particulate compositions as previously defined, whose chemical compositions corresponds to the formula:

$$(1-z)Fe_2O_3, zMFe_2O_4, yM'^{(n)}O_{n/2}$$

in which:

M represents at least one bivalent metal selected from cobalt, iron, zinc, copper, magnesium, nickel, manganese and cadmium, M' represents a substituent or adjuvant selected from those mentioned above, with the understanding that when an alkali metal is present, at least one other adjuvant or substituent is also present, n is the valence of M', z represents the number of moles of bivalent metal M, z being such that the bivalent metal represents between 1 and 10%, preferably between 1 and 5% of the total weight of the composition, and y represents the number of moles of substituent and/or adjuvant M', y being such that M' represents between 0.2 and 5% by weight of the composition.

Of course, when several substituents or dopants M' are present, the respective valences and proportions of the elements M' must be taken into account to calculate the quantity of oxygen represented by yn/2.

For example, if $yM'^{(n)}O_{n/2}$ represents two oxides of the elements $M'_{(1)}$ and $M'_{(2)}$, with valences $n_1$ and $n_2$, respectively, present in the respective molar proportions $y_1$ and $y_2$ (where $y_1+y_2=y$), then yn/2 is expressed by:

$$\frac{(n_1 y_1 + n_2 y_2)}{2}$$

Another object of the invention is a process for preparing the particulate compositions as defined above.

This process, comprising steps consisting of decomposing the starting mixed oxalate by heating it in air, reducing the resulting product in a hydrogen atmosphere and then oxidizing the reduced product by heating it in air, is characterized by the fact that before the reduction step, the oxides obtained after the decomposition step are subjected to a heat treatment in an oxidizing atmosphere at a temperature of 550°–700° C. for a period which can vary between approximately ten minutes and five hours.

This heat treatment is performed, for example, in air.

The temperature rise for this heat treatment must be relatively rapid; it is preferably 150°–300° C. per hour.

The purpose of this heat treatment step is internal sintering of the elementary grains, with densification of the particles, and making it possible to prevent the formation of dendrites or particles with a granular texture.

The optimum temperature and treatment time are determined, in each case, by observing samples of the treated composition with an electron microscope. The conditions to be used are of course those which lead to the production of particles in which the crystals have the largest dimensions, that is, in practice, particles in which crystallite boundaries are seen to disappear or substantially decrease in number. The temperature and the treatment time must nonetheless be sufficiently low to prevent the appearance of external sintering.

At the end of the heat treatment, a quenching step is performed, for example, quenching in air.

In the starting mixed oxalate, the elements other than carbon and oxygen are generally present in the proportions desired in the final oxide.

However, it is also possible to mix the adjuvants and even the substituent elements into the starting oxalate as additives. For example, the oxalate can be impregnated with a solution of the adjuvant and/or substituent elements in an appropriate solvent. In this case, the substituent or even adjuvant elements are primarily present only in the surface layers of the final oxide particles.

In particular embodiments, the process according to the invention can also present the following characteristics, taken in isolation or in combination.

The oxalic precursors and any additives are decomposed in an oxidizing atmosphere at a temperature between 180° and 300° C. with a slow temperature rise, for example, less than 20° C. per hour when working in air; this decomposition step is preferably performed on the starting material present as a thin layer, so that good temperature homogeneity is obtained with air scavenging; the more oxidizing the atmosphere, the slower the temperature rise must be.

The reduction step is performed in an atmosphere consisting of a mixture of hydrogen and an inert gas containing between 8 and 30% by volume of hydrogen and containing no water vapor, or containing less than 3% by volume thereof; this is because it has been found that the presence of water in excessive proportions caused excessively rapid growth of the crystals within the needles and therefore caused them to burst and break into spherical particles which often had excessively small dimensions and did not have the required geometrical anisotropy; the inert gas is, for example, nitrogen.

Reduction occurs at a temperature greater than 300° C., preferably at a temperature of 320°–500° C., until the alpha-$Fe_2O_3$ phase disappears; the heating time should be as short as possible (generally one to two hours) to prevent external sintering; the reduction step is preferably followed by quenching, for example, in air. Disappearance of the alpha-$Fe_2O_3$ phase can be observed by X-ray diffraction.

The final oxidation step is performed by heating in air at a temperature of 100°–500° C. with a relatively rapid temperature rise, for example, 150° C. per hour; it is preferable to proceed at the minimum temperature sufficient to allow the desired oxidation of the composition within an acceptable period, for example, on the order of approximately two hours; rapid cooling then follows, for example, by means of air quenching.

The process according to the invention can comprise, if desired, a supplementary step in cases where one wishes to increase the size of the crystals. To do so, at the end of the reduction stage, instead of performing quenching, the composition is subjected to a heat treatment in an inert atmosphere (i.e., one which is neither oxidizing nor reducing, for example, under nitrogen or dry argon) at a temperature between approximately 450° and 700° C. The temperature rise is, for example, on the order of 150° to 250° C./hour. This sort of heat treatment promotes crystal growth and the reduction of porosity. In each case, the optimum treatment temperature and time are determined by monitoring the resulting change in crystal size by observing the width of lines on X-ray diffraction spectra. At the end of this heat treatment, quenching is performed, for example, in air.

It is easy to introduce Fe(II) as a substituent in the last step of the process, during which the magnetites are oxidized. To prevent complete oxidation of Fe(II) to Fe(III), either oxidation can be performed at a low temperature (for example, at 100°–250° C.), or oxygen consumption can be limited by controlling the composition of the atmosphere in the enclosure. In other cases, the oxidation step is performed at a higher temperature (200°–500° C.).

Introduction of Fe(II) into the crystal lattice is of interest since it is the only inexpensive substituent with a positive magnetostriction coefficient. It can especially be combined with cobalt, whose magnetostriction coefficient is negative.

The oxalate compositions used as starting products in the process according to the invention can be prepared according to known processes. They can also be prepared by a process characterized by the fact:

that, on the one hand, a solution is prepared containing 0.1 to 1 mole per liter of oxalic acid in a first organic solvent having a dielectric constant less than 30, with the said solution containing a maximum of 15% water by volume;

that, on the other hand, a concentrated solution of at least one mineral salt of the metal or metals which one wishes to produce in the form of an oxalate is prepared in a liquid medium containing at least 25% by volume of a second organic solvent chosen from methanol, ethanol, tetrahydrofuran and the polyols which are liquid at ambient temperature or mixtures of these solvents, with any remainder of the said liquid medium consisting of water, with the total concentration of the salts being greater than one mole/liter, with the said solution being acidified to promote solubilization of the salts and furthermore possibly containing dopants;

then, that the said salt solution is progressively poured into the said oxalic acid solution while agitating the latter to produce a particulate oxalate precipitate;

with the understanding that at least one of the said organic solvents is an alcohol.

This latter process, which does not form part of the invention claimed here, is especially characterized by the fact that minimal quantities of water are used in the starting solutions of salts and oxalic acid. In addition, this process makes it possible to control the dimensions of the particles by selecting the solvents, with the use of solvents with a low dielectric constant and the absence of water (or the presence of small quantities of water) promoting the production of particles of reduced length.

The oxide particles obtained by means of the process according to the invention are dimensionally quite homogeneous and have interesting magnetic properties enabling them to be used in the production of materials for magnetic recording, for example, for high-density magnetic recording. This use also forms part of the invention.

The following examples illustrate the invention, although without limiting it. These examples more specifically illustrate the preparation of magnetic powders suitable for high-density recording.

EXAMPLE 1

The starting product used is a composition of acicular mixed oxalate particles with the formula:

$$(Fe_{0.9391}Co_{0.0420}Zn_{0.0124}Ba_{0.0064})^{2+}C_2O_4^{2-}, 2H_2O.$$

Ten grams of this oxalate are decomposed in a tubular furnace which is heated to a temperature of 300° C. with a temperature rise of 20° C. per hour.

A sintering operation is then performed by bringing the resulting oxide at a rate of 300° C. per hour to a temperature of 600° C., at which it is kept for 15 minutes. Air quenching is performed to retain the acicular shape of the particles and to produce a nongranular internal texture with no dendrites.

The resulting oxide is then reduced by heating it in an $N_2/H_2$ atmosphere (90/10) at a rate of 150° C. per hour to a temperature of 350° C., which is maintained for two hours. After air cooling, the resulting product is oxidized by heating in air with a temperature rise of 150° C. per hour to a temperature of 430° C. which is maintained for two hours. Cooling is performed by quenching in air.

The resulting product is in the form of acicular particles with an average length of 0.37±0.006 μm and an average diameter of 0.045±0.09 μm.

The structure of this oxide, studied by X-ray diffraction, is of the defect spinel type deriving from gamma-$Fe_2O_3$.

The particles obtained have the following composition (by weight):
  Co=3.08%
  Zn=1.01%
  Ba=1.10%
Values for magnetic properties are as follows:
  $H_c$=780 Oe
  $\sigma R$=39.9 u.e.m./g
Differential thermal analysis: transformation temperature=650° C.

The starting mixed oxalate, preparation of which does not form part of the invention, was prepared as follows.

A solution A of 0.5 molar oxalic acid is prepared by dissolving 13.75 g of oxalic acid in 95% by volume of ethyl alcohol at ambient temperature.

A twofold molar solution B is prepared by dissolving, in a mixture containing 60% water and 40% ethylene glycol, the following salts:
  $FeCl_2, 4H_2O$: 18.7 g
  $CoCl_2, 6H_2O$: 1 g
  $ZnCl_2$: 0.5 g
  $BaCl_2$: 0.8 g
0.5 cm³ of a 12N aqueous solution of hydrochloric acid is added to the mixture.

Solution B is added to solution A with vigorous agitation, by atomizing solution B at a rate of 7 liters/hour over solution A, using an atomizer producing droplets with an average size of 0.8 mm.

The precipitated oxalate particles are washed and dried.

EXAMPLE 2

The procedure is analogous to that described in Example 1, starting with a mixed oxalate with the formula:

$$(Fe_{0.9393}Co_{0.0430}Zn_{0.0147}Ba_{0.0030})^{2+}C_2O_4^{2-}, 2H_2O.$$

The final oxide possesses morphological and structural properties identical to those of the oxide obtained in Example 1.

The particles obtained have the following composition (by weight):
  Co=3.16%
  Zn=1.2%
  Ba=0.51%
Values for magnetic properties are as follows:
  $H_c$=740 Oe
  $\sigma R$=43.9 u.e.m./g The starting oxalate is prepared in a manner similar to the preparation of the starting oxalate in Example 1, using suitable proportions of ferrous chloride, cobalt chloride, zinc chloride and barium chloride.

EXAMPLE 3

The procedure is analogous to that described in Example 1, starting with a mixed oxalate of the formula:

$$(Fe_{0.9335}Co_{0.0433}Zn_{0.0108}Ba_{0.0124})^{2+}C_2O_4^{2-}, 2H_2O.$$

The starting oxalate particles had the following characteristics:
  average length: 0.29 μm
  average diameter: 0.042 μm
  average acicular ratio: 6.9.
The oxide particles obtained have the following characteristics:
  average length: 0.21 μm
  average diameter: 0.045 μm
  average acicular ratio: 4.7.
The particles obtained have the following composition (by weight):
  Co=3.16%
  Zn=0.87%
  Ba=2.1%
Values for magnetic properties are as follows:
  $H_c$=751 Oe
  $\sigma R$=36 u.e.m./g
Differential thermal analysis: transformation temperature=740° C.

The starting oxalate is prepared in a manner analogous to that described in Example 1.

EXAMPLE 4

The procedure is analogous to that described in Example 1, starting with a mixed oxalate of the formula:

$$(Fe_{0.9450}Co_{0.0437}Ba_{0.0112})^{2+}C_2O_4^{2-}, 2H_2O.$$

The starting oxalate particles had the following characteristics:
  average length: 0.30 μm
  average diameter: 0.045 μm
  average acicular ratio: 6.7.
The oxide particles obtained have the following characteristics:
  average length: 0.19 μm
  average diameter: 0.047 μm average acicular ratio: 4.

The particles obtained have the following composition (by weight):

Co=3.19%
Ba=1.91%

Values for magnetic properties are as follows:

$H_c$=800 Oe
$\sigma R$=40.5 u.e.m./g

Differential thermal analysis: transformation temperature=730° C.

The starting oxalate is prepared in a manner analogous to that described in Example 1.

EXAMPLE 5

The procedure is analogous to that described in Example 1, except the starting product is a mixed oxalate doped with boron (in the form of boric acid) with the following formula:

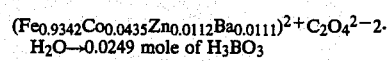
$(Fe_{0.9342}Co_{0.0435}Zn_{0.0112}Ba_{0.0111})^{2+}C_2O_4^{2-} \cdot 2H_2O \rightarrow 0.0249$ mole of $H_3BO_3$ The sintering treatment in air is performed at 630° C. for 30 minutes.

The reduction treatment is performed at 430° C. for four hours 30 minutes.

The oxide obtained is in the form of acicular particles with an average length of 0.33±0.06 μm and an average diameter of 0.040±0.009 μm.

The structure is of the defect spinel type, indentical to that of gamma-$Fe_2O_3$.

The composition of the oxide is as follows:

Co=3.14%
Zn=0.90%
Ba=1.86%
B=0.33%

The magnetic properties are as follows $H_c$=670 Oe
$\sigma R$=33.7 u.e.m./g

Differential thermal analysis: transformation temperature=780° C.

The starting oxalate is prepared in a manner analogous to that described in Example 1. This oxalate is then brought into contact with an aqueous solution of 3% boric acid by weight with 500 cm³ of solution per 15 grams of oxalate.

EXAMPLE 6

The procedure is as in Example 5, but after the reduction step, the hydrogen supply is cut off and the composition is heated under nitrogen to 610° C. for three hours with a temperature rise on the order of 200° C. per hour. Air cooling is performed and then the oxidation step is performed as in Example 5.

This results in a composition analogous to that in Example 5, but thanks to the supplementary heat treatment, the average dimensions of the crystals are 550 Angstroms, rather than 300 Angstroms for the composition in Example 5.

EXAMPLE 7

The procedure is analogous to that described in Example 1, starting with a mixed oxalate of the formula:

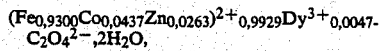
$(Fe_{0.9300}Co_{0.0437}Zn_{0.0263})^{2+}_{0.9929}Dy^{3+}_{0.0047} C_2O_4^{2-}, 2H_2O$, The final oxide has morphological and structural characteristics identical to those of the oxide obtained in Example 1.

The particles obtained have the following composition (by weight):

Co=3.19%
Zn=2.13%
Dy=0.96%

Values for magnetic properties are as follows:

$H_c$=670 Oe
$\sigma R$=36 u.e.m./g

Differential thermal analysis: transformation temperature=590° C.

The starting oxalate is prepared in a manner analogous to that described in Example 1. Dysprosium is introduced in the form of the chloride $DyCl_3$.

EXAMPLE 8

The procedure is analogous to that described in Example 1, starting with a mixed oxalate of the formula:

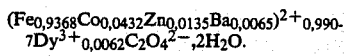
$(Fe_{0.9368}Co_{0.0432}Zn_{0.0135}Ba_{0.0065})^{2+}_{0.9907}Dy^{3+}_{0.0062}C_2O_4^{2-}, 2H_2O$.

The final oxide has morphological and structural characteristics identical to those of the oxide obtained in Example 1.

The particles obtained have the following composition (by weight):

Co=3.12%
Zn=1.08%
Dy=1.25%
Ba=1.22%

Values for magnetic properties are as follows:

$H_c$=710 Oe
$\sigma R$=38 u.e.m./g

Differential thermal analysis: transformation temperature=720° C.

The starting oxalate is prepared in a manner analogous to that described in Example 7.

EXAMPLE 9

The procedure is analogous to that described in Example 1, starting with a mixed oxalate of the formula:

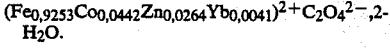
$(Fe_{0.9253}Co_{0.0442}Zn_{0.0264}Yb_{0.0041})^{2+}C_2O_4^{2-}, 2H_2O$.

The final oxide has morphological and structural characteristics identical to those of the oxide obtained in Example 1.

The particles obtained have the following composition (by weight):

Co=3.24%
Zn=2.15%
Yb=0.88%

Values for magnetic properties are as follows:

$H_c$=735 Oe
$\sigma R$=38 u.e.m./g

Differential thermal analysis: transformation temperature=570° C.

The starting oxalate is prepared in a manner analogous to that described in Example 1. Ytterbium is introduced in the form of the chloride $YbCl_2$.

EXAMPLE 10

The procedure is analogous to that described in Example 1, starting with a mixed oxalate of the formula:

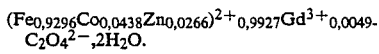

The final oxide has morphological and structural characteristics identical to those of the oxide obtained in Example 1.

The particles obtained have the following composition (by weight):
Co=3.20%
Zn=2.11%
Gd=0.96%

Values for magnetic properties are as follows:
$H_c$=673 Oe
$\sigma R$=35 u.e.m./g Differential thermal analysis: transformation temperature=610° C.

The starting oxalate is prepared in a manner analogous to that described in Example 1. Gadolinium is introduced in the form of the chloride $GdCl_3,6H_2O$.

EXAMPLE 11

The procedure is analogous to that described in Example 1, starting with a mixed oxalate of the formula:

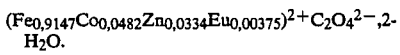

The final oxide has morphological and structural characteristics identical to those of the oxide obtained in Example 1.

The particles obtained have the following composition (by weight):
Co=3.54%
Zn=2.72%
Eu=0.71%

Values for magnetic properties are as follows:
$H_c$=758 Oe
$\sigma R$=38.5 u.e.m./g The starting oxalate is prepared in a manner analogous to that described in Example 1. Europium is introduced in the form of the nitrate $Eu(NO_3)_2$.

EXAMPLE 12

The procedure is analogous to that described in Example 1, starting with a mixed oxalate of the formula:

$(Fe_{0.9237}Co_{0.0438}Zn_{0.0325})^{2+}{}_{0.9972}Sb_{0.0018}{}^{3+}\cdot C_2O_4{}^{2-},2H_2O$ The final oxide has morphological and structural characteristics identical to those of the oxide obtained in Example 1.

The particles obtained have the following composition (by weight):
Co=3.32%
Zn=2.65%
Sb=0.28%

Values for magnetic properties are as follows:
$H_c$=720 Oe
$\sigma R$=27 u.e.m./g The starting oxalate is prepared in a manner analogous to that described in Example 1. Antimony is introduced in the form of the chloride $SbCl_3$.

EXAMPLE 13

The procedure is analogous to that described in Example 1, starting with a mixed oxalate of the formula:

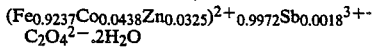

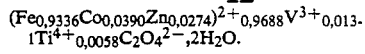

The final oxide has morphological and structural characteristics identical to those of the oxide obtained in Example 1.

The particles obtained have the following composition (by weight):
Co=2.83%
Zn=2.20%
V=0.85%
Ti=0.35%

Values for magnetic properties are as follows:
$H_c$=550 Oe
$\sigma R$=33.6 u.e.m./g The starting oxalate is prepared in a manner analogous to that described in Example 1. Titanium is introduced in the form of $TiCl_3$ and vanadium in the form of $VCl_3$.

EXAMPLE 14

The procedure is analogous to that described in Example 1, starting with a mixed oxalate of the formula:

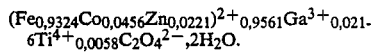

The final oxide has morphological and structural characteristics identical to those of the oxide obtained in Example 1.

The particles obtained have the following composition (by weight):
Co=3.26%
Zn=1.75%
Ga=1.91%
Ti=0.16%

Values for magnetic properties are as follows:
$H_c$=660 Oe
$\sigma R$=36.7 u.e.m./g The starting oxalate is prepared in a manner analogous to that described in Example 1. Gallium is introduced in the form of the sulfate $Ga_2(SO_4)_3$, and titanium in the form of $TiCl_3$.

EXAMPLE 15

The procedure is analogous to that described in Example 1, starting with a mixed oxalate of the formula:

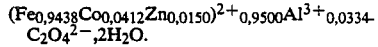

The final oxide has morphological and structural characteristics identical to those of the oxide obtained in Example 1.

The particles obtained have the following composition (by weight):
Co=2.97%
Zn=1.20%
Al=1.16%

Values for magnetic properties are as follows:
$H_c$=635 Oe
$\sigma R$=35.4 u.e.m./g The starting oxalate is prepared in a manner analogous to that described in Example 1. Aluminum is introduced in the form of the chloride $AlCl_3$.

EXAMPLE 16

The procedure is analogous to that described in Example 1, starting with a mixed oxalate of the formula:

$(Fe_{0.9304}Co_{0.0433}Zn_{0.0263})^{2+}C_2O_4^{2-},2H_2O$

The final oxide has morphological and structural characteristics identical to those of the oxide obtained in Example 1.
The particles obtained have the following composition (by weight):
Co=3.16%
Zn=2.20%
Values for magnetic properties are as follows:
$H_c$=665 Oe
$\sigma R$=43.3 u.e.m./g
Differential thermal analysis: transformation temperature=590° C.
The starting oxalate is prepared in a manner analogous to that described in Example 1.

EXAMPLE 17

The procedure is analogous to that described in Example 1, starting with a mixed oxalate of the formula:

$(Fe_{0.912}Co_{0.043}Zn_{0.012}Ba_{0.006}Mn_{0.027})^{2+}C_2O_4^{2-},2H_2O.$

The oxide particles obtained have the following composition (by weight):
Co=3.16%
Zn=0.94%
Ba=1.10%
Mn=1.84%
Magnetic properties:
$H_c$=691 Oe
$\sigma R$=43.9 u.e.m./g.

EXAMPLE 18

The procedure is analogous to that described in Example 5, starting with a mixed oxalate of the formula:

$(Fe_{0.953}Co_{0.038}Ba_{0.009})^{2+}C_2O_4^{2-},2H_2O+0.043$ mole de $H_3BO_3$.

However, the final oxidation treatment is performed at a temperature of 220° C. (rather than 430° C.) for two hours, which makes it possible to keep some of the iron in the form of iron(II).
The starting oxalate particles had the following characteristics:
average length: 0.33 μm
average diameter: 0.042 μm
average acicular ratio: 7.9.
The oxide particles obtained have the following characteristics:
average length: 0.22 μm
average diameter: 0.044 μm
average acicular ratio: 5.
The oxide particles obtained have the following composition (by weight):
Co=2.81%
Ba=1.49%
B=0.59%
$Fe^{2+}$=30% of total iron
Magnetic properties:
$H_c$=800 Oe
$\sigma R$=36.2 u.e.m./g
Transformation temperature=740° C.

EXAMPLE 19

The procedure is analogous to that described in Example 1, starting with a mixed oxalate of the formula:

$(Fe_{0.922}Co_{0.035}Ca_{0.043})^{2+}C_2O_4^{2-},2H_2O$

The oxide particles obtained have the following composition (by weight):
Co=2.63%
Ca=2.18%
Magnetic properties:
$H_c$=542 Oe
$\sigma R$=44.5 u.e.m./g
Transformation temperature: 720° C.
The starting oxalate particles had the following characteristics:
average length: 0.28 μm
average diameter: 0.04 μm
average acicular ratio: 7.
The oxide particles obtained have the following characteristics:
average length: 0.19 μm
average diameter: 0.043 μm
average acicular ratio: 4.4.

EXAMPLE 20

The procedure is analogous to that described in Example 1, starting with a mixed oxalate of the formula:

$(Fe_{0.951}Co_{0.036}Sr_{0.013})^{2+}C_2O_4^{2-},2H_2O$

The particles obtained have the following composition (by weight):
Co=2.68%
Sr=1.42%
Magnetic properties:
$H_c$=642 Oe
$\sigma R$=44.7 u.e.m./g
Transformation temperature: 780° C.

EXAMPLE 21

The procedure is analogous to that described in Example 1, starting with a mixed oxalate of the formula:

$(Fe_{0.941}Co_{0.037}Cd_{0.023})^{2+}C_2O_4^{2-},2H_2O$

The particles obtained have the following composition (by weight):
Co=2.56%
Cd=0.023%
Magnetic properties:
$H_c$=683 Oe
$\sigma R$=40.2 u.e.m./g
Transformation temperature: 625° C.

We claim:
1. A particulate magnetic oxide composition made of particles having a defect spinel structure, consisting essentially of (i) iron (III) oxide, (ii) an oxide of at least one bivalent metal selected from the group consisting of cobalt, iron, copper, zinc, magnesium, nickel, manganese and cadmium, and (iii), in the form of an oxide thereof, at least one adjuvant or substituent selected from the group consisting of an alkali metal, an alkaline earth metal, boron, aluminum, gallium, germanium, tin, arsenic, indium, antimony, bismuth, lead, the 3d and 4d transition metals other than those already mentioned and a rare earth elements, wherein the weight of said at least one bivalent metal represents between 1 and 10 percent of the weight of said composition, and wherein the weight of said at least one adjuvant or substituent represents between 0.2 and 5 percent of the weight of said composition, with the proviso that when an alkali metal or tin is present, at least one other adjuvant or substituent is also present.

2. The composition of claim 1 wherein the weight of said at least one bivalent metal represents between 1 and 5 percent of the total weight.

3. The composition of claim 1 wherein said 3d transition metal is selected from the group consisting of scandium, titanium, vanadium and chromium.

4. The composition of claim 1 wherein said 4d transition metal is selected from the group consisting of yttrium, zirconium, niobium and molybdenum.

5. The composition of claim 1 wherein said rare earth is selected from the group consisting of neodymium, praseodymium, samarium, europium, gadolinium, terbium, dysprosium, holmium, erbium, ytterbium, lutetium, thulium and cerium.

6. The composition of claim 1 having a chemical composition corresponding to the formula:

$$(1-z)Fe_2O_3, zMFe_2O_4, yM'^{(n)}O_{n/2}$$

wherein
M represents at least one bivalent metal selected from the group consisting of cobalt, iron, zinc, copper, magnesium, nickel, manganese and cadmium;
M′ represents a substituent or adjuvant as defined in claim 1, with the proviso that when an alkali metal or tin is present at least one other adjuvant or substituent is also present;
n is the valence of M′;
z represents the number of moles of said bivalent metal M, z being such that said bivalent metal represents between 1 and 10 percent of the total weight of said composition; and
Y represents the number of moles of M′, y being such that M′ represents between 0.2 and 5 percent by weight of said composition.

7. The composition of claim 1 wherein said particles have lengths between 0.05 and 0.5 μm with an acicular ratio between 2 and 5.

8. The composition of claim 1 wherein at least 80 percent of said particles have a length equal to the average length ±1.0 μm and an acicular ratio between approximately 2 and 5, said average length being between 0.15 and 0.35 μm.

9. A process for preparing a particulate magnetic oxide composition made of particles having a defect spinel structure, considering essentially or (i) iron(III) oxide, (ii) an oxide of at least one bivalent metal selected from the group consisting of cobalt, iron, copper, zinc, magnesium, nickel, manganese and cadmium, and (iii) in the form of an oxide thereof, at least one adjuvant or substituent selected from the group consisting of an alkali metal, an alkaline earth metal, boron, aluminum, gallium, germanium, tin, arsenic, indium, antimony, bismuth, lead, the 3d and 4d transition metals other than those already mentioned and a rare earth elements, wherein the weight of said at least one bivalent metal represents between 1 and 10 percent of the weight of said composition, and wherein the weight of said at least one adjuvant or substituent represents between 0.2 and 5 percent of the weight of said composition, with the proviso that when an alkali metal or tin is present, at least one other adjuvant or substituent is also present, said process comprising the steps of heating in air a corresponding mixed oxalate until decomposition of said mixed oxalate, subjecting the resulting product to a heat treatment, at a rate of 150°–300° C. per hour, in an oxidizing atmosphere at a temperature of 550°–700° C. for a period of from ten minutes to five hours, reducing the resulting product in a hydrogen atmosphere until the alpha-Fe$_2$O$_3$ phase disappears, and then oxidizing the reduced product by heating in air at a temperature of 100°–500° C. until the desired composition is obtained, and rapidly cooling the resulting composition.

10. The process of claim 9 which includes performing an additional heat treatment after the reduction step in an inert atmosphere at a temperature of between 450° and 700° C. so as to increase the size of the crystals.

11. The process of claim 9 wherein when said adjuvant or substituent is not present in the starting mixed oxalate, said adjuvant or substituent being introduced into said mixed oxalate as an additive.

12. The process of claim 9 wherein said mixed oxalate and any substituent or adjuvant are decomposed at a temperature between 180° and 300° C. with a temperature rise of less than 20° C. per hour.

13. The process of claim 9 wherein the reduction step is performed in an atmosphere consisting of a mixture of hydrogen and an inert gas containing between 8 and 30 percent by volume of hydrogen and containing no water vapor or containing less than 3 percent by volume thereof.

14. The process of claim 9 wherein the reduction is performed at a temperature greater than 330° and lower than 500° C.

15. The process of claim 9 wherein the final oxidation step is performed by heating in air at a temperature of 100°–500° C., said temperature being between approximately 100° and 250° C. when the desired final composition contains iron (II) and between 200° and 500° C. in other cases.

16. The process of claim 9 wherein the oxidation step is performed at a temperature of 100°–250° C. so as to obtain a composition containing bivalent iron.

* * * * *